United States Patent
Liu et al.

(10) Patent No.: US 11,329,475 B2
(45) Date of Patent: May 10, 2022

(54) MULTI-LEVEL OVER-CURRENT PROTECTION CIRCUIT

(71) Applicants: LITE-ON ELECTRONICS (GUANGZHOU) LIMITED, Guangzhou (CN); LITE-ON TECHNOLOGY CORPORATION, Taipei (TW)

(72) Inventors: Huan-Cheng Liu, Taipei (TW); Yu-Ho Lin, Taipei (TW)

(73) Assignees: LITE-ON ELECTRONICS (GUANGZHOU) LIMITED; LITE-ON TECHNOLOGY CORPORATION

( * ) Notice: Subject to any disclaimer, the term of this patent is extended or adjusted under 35 U.S.C. 154(b) by 0 days.

(21) Appl. No.: 17/088,452

(22) Filed: Nov. 3, 2020

(65) Prior Publication Data

US 2022/0045498 A1     Feb. 10, 2022

(30) Foreign Application Priority Data

Aug. 6, 2020   (CN) .......................... 202010781539.0

(51) Int. Cl.
  *H02H 3/093*     (2006.01)
  *H02H 1/00*      (2006.01)
(52) U.S. Cl.
  CPC ........ *H02H 3/0935* (2013.01); *H02H 1/0007* (2013.01)
(58) Field of Classification Search
  CPC ..................... H02H 3/093–0935; H02H 3/08
  See application file for complete search history.

(56) References Cited

U.S. PATENT DOCUMENTS

| 9,246,395 B1 | 1/2016 | Choi et al. | |
| 2017/0063074 A1* | 3/2017 | Yasusaka | H03K 17/0822 |
| 2017/0146583 A1* | 5/2017 | Baik | H03K 17/0822 |
| 2017/0279261 A1* | 9/2017 | Riley | B60R 16/03 |
| 2018/0294635 A1* | 10/2018 | Kozuki | H02H 3/093 |

OTHER PUBLICATIONS

Communication corresponding to Taiwan Application No. 109126681 and issued by Taiwan Intellectual Property Office dated Feb. 8, 2021, 5 pages.

* cited by examiner

*Primary Examiner* — Jared Fureman
*Assistant Examiner* — Christopher J Clark
(74) *Attorney, Agent, or Firm* — Innovation Counsel LLP

(57) ABSTRACT

A multi-level over-current protection circuit includes: a signal amplification circuit configured to receive a set of detection signals and output a first signal; a comparison circuit to compare the first signal with a first reference signal and a second reference signal respectively; and a time delay counting circuit. The time delay counting circuit adjusts a first count value when the first signal is higher than or equal to the first reference signal and smaller than the second reference signal, and the time delay counting circuit activates a protection mode when the first count value reaches a first protection time delay. The time delay counting circuit adjusts a second count value when the first signal is higher or equal to the second reference signal, and activates the protection mode when the second count value reaches a second protection time delay.

7 Claims, 4 Drawing Sheets

MULTI-LEVEL OVER-CURRENT PROTECTION CIRCUIT

This application claims the benefit of People's Republic of China application Serial No. 202010781539.0, filed Aug. 6, 2020, the subject matter of which is incorporated herein by reference.

BACKGROUND OF THE INVENTION

Field of the Invention

The invention relates in general to a multi-level over-current protection circuit.

Description of the Related Art

According to the safety regulations, the conventional power supplier, under whatever load condition, cannot continuously output high energy. Over the years, the instant dynamic load of the central processing unit (CPU) seems to increase year by year. To comply with the safety regulations, the output of the CPU needs to be divided. However, the conventional system monitoring circuit can only set single-point current protection and single protection time delay for one set of output, and cannot tackle with the situation of multiple sets of output.

SUMMARY OF THE INVENTION

According to one embodiment of the present invention, a multi-level over-current protection circuit is provided. The multi-level over-current protection circuit, coupled to a power supplier, includes: a signal amplification circuit configured to receive a set of detection signals and output a first signal; a comparison circuit coupled to the signal amplification circuit to compare the first signal with a first reference signal and a second reference signal respectively, wherein a value of the first reference signal is less than a value of the second reference signal; and a time delay counting circuit coupled to the comparison circuit. When a value of the first signal is greater than or equal to the value of the first reference signal and is less than the value of the second reference signal, the time delay counting circuit adjusts a first count value; when the first count value reaches a first protection time delay, the time delay counting circuit activates a protection mode. When the value of the first signal is greater than or equal to the value of the second reference signal, the time delay counting circuit adjusts a second count value; when the second count value reaches a second protection time delay, the time delay counting circuit activates the protection mode. The first protection time delay is greater than the second protection time delay.

The above and other aspects of the invention will become better understood with regard to the following detailed description of the preferred but non-limiting embodiment(s). The following description is made with reference to the accompanying drawings.

DETAILED DESCRIPTION OF THE INVENTION

Technical terms are used in the specification with reference to generally-known terminologies used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all of the technical features of any embodiment of the present disclosure.

Figure 1:
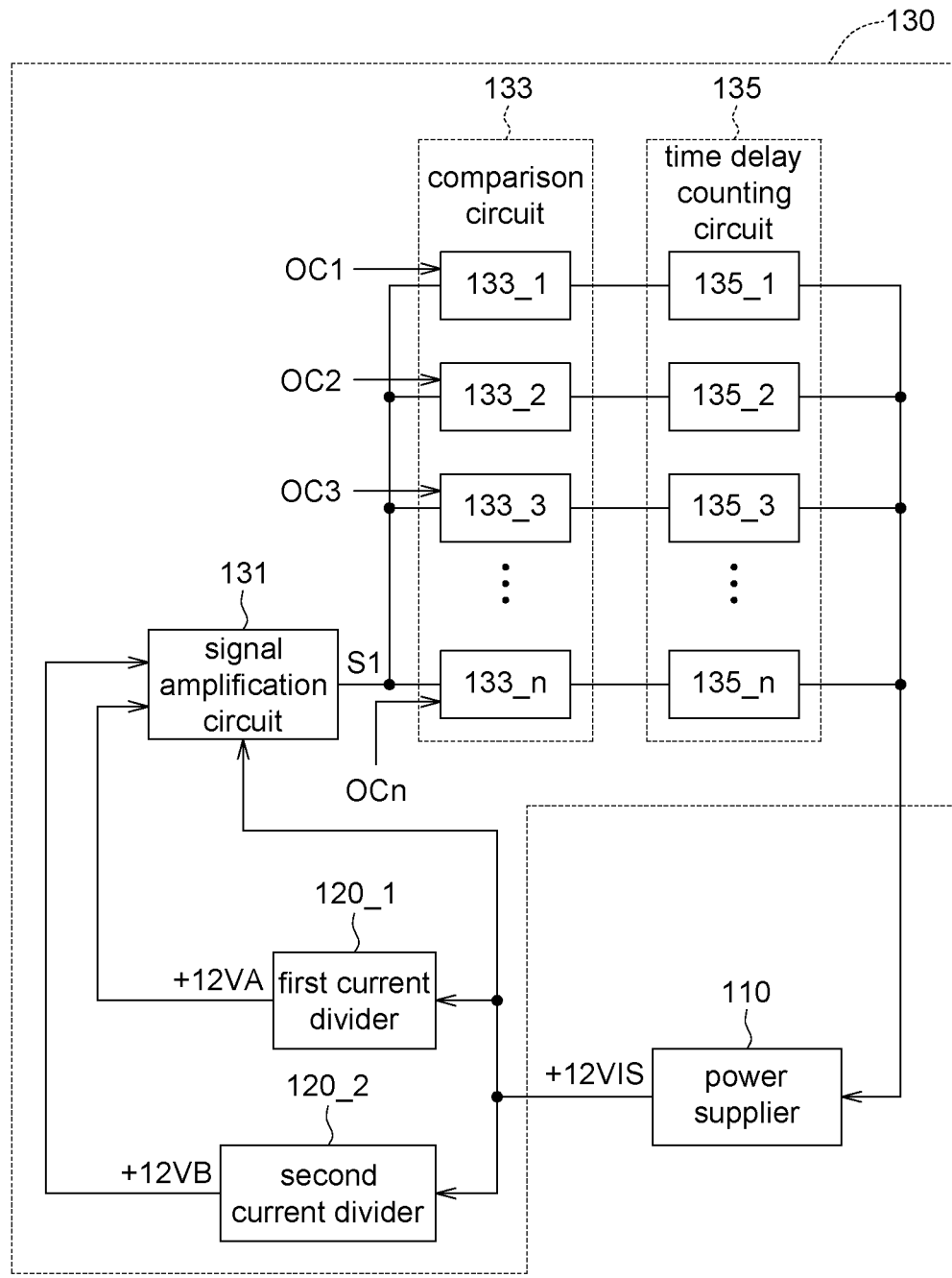
FIG. 1 is a functional block diagram of a multi-level over-current protection circuit according to an embodiment of the present invention.
Figure 2:
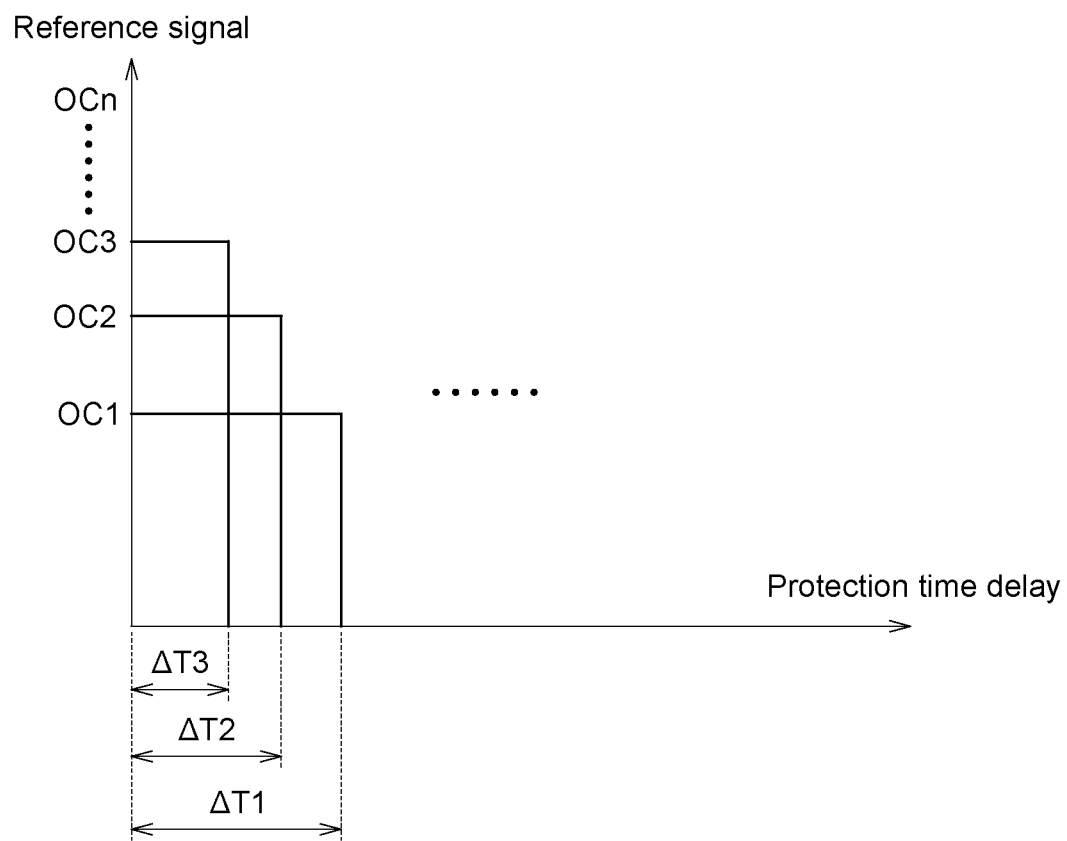
FIG. 2 is a relation diagram of reference signals and protection time delays according to an embodiment of the present invention.

Referring to FIG. 1, a functional block diagram of a multi-level over-current protection circuit according to an embodiment of the present invention is shown. FIG. 2 is a relation diagram of reference signals and protection time delays according to an embodiment of the present invention.

When the set conditions are met, the multi-level over-current protection circuit 130 according to an embodiment of the present invention activates a protection mode.

The multi-level over-current protection circuit 130, coupled to the power supplier 110, includes: a signal amplification circuit 131 configured to receive a set of detection signals and output the first signal S1; a comparison circuit 133 coupled to the signal amplification circuit 131 to compare the first signal S1 with the first reference signal (OC1) and the second reference signal (OC2) respectively, wherein the value of the first reference signal (OC1) is less than the value of the second reference signal (OC2); and the time delay counting circuit 135 coupled to the comparison circuit 133.

When the value of the first signal is greater than or equal to the value of the first reference signal OC1 and is less than the value of the second reference signal CO2, the time delay counting circuit 135 adjusts the first count value; and when the first count value reaches the first protection time delay (such as $\Delta T1$ of FIG. 2), the time delay counting circuit 135 activates a protection mode.

When the value of the first signal is greater than or equal to the value of the second reference signal CO2, the time delay counting circuit 135 adjusts the second count value; and when the second count value reaches the second protection time delay (such as $\Delta T2$ of FIG. 2), the time delay counting circuit 135 activates the protection mode.

The first protection time delay (such as $\Delta T1$ of FIG. 2) is greater than the second protection time delay (such as $\Delta T2$ of FIG. 2).

The comparison circuit 133 further compares the first signal S1 with the third reference signal (OC3). When the value of the first signal is greater than or equal to the value of the third reference signal OC3, the time delay counting circuit 135 adjusts the third count value; and when the third count value reaches the third protection time delay (such as $\Delta T3$ of FIG. 2), the time delay counting circuit 135 activates the protection mode, wherein, the value of the second reference signal CO2 is less than the value of the third reference signal OC3, and the second protection time delay is greater than the third protection time delay.

To put it in greater, the comparison circuit 133 includes n comparison units 133_1 to 133_n, wherein n is a positive integer. The comparison units 133_1 to 133_n are coupled to the signal amplification circuit 131. The comparison units 133_1 to 133_n compare the first signal S1 with the first reference signal (OC1) to the n-th reference signal (OCn) respectively, wherein, OC1<OC2< . . . <OCn.

To put it in greater, the time delay counting circuit 135 includes n time delay counting units 135_1 to 135_n, which are coupled to the comparison units 133_1 to 133_n.

When the value of the first signal is greater than or equal to the value of the first reference signal OC1 and is less than the value of the second reference signal CO2, the time delay counting unit 135_1 of the time delay counting circuit 135 adjusts (such as increases) the first count value in response to the output signal of the comparison circuit 133; and when the first count value reaches the first protection time delay (such as $\Delta T1$ of FIG. 2), the time delay counting unit 135_1 of the time delay counting circuit 135 activates the protection mode.

When the value of the first signal is greater than or equal to the value of the second reference signal CO2, the time delay counting unit 135_2 of the time delay counting circuit 135 adjusts the second count value in response to the output signal of the comparison circuit 133; and when the second count value reaches the second protection time delay (such as $\Delta T2$ of FIG. 2), the time delay counting unit 135_2 of the time delay counting circuit 135 activates the protection mode.

When the value of the first signal is less than the value of the first reference signal OC1, the time delay counting unit 135_1 of the time delay counting circuit adjusts the first count value to 0.

When the value of the first signal is less than the value of the second reference signal CO2, the time delay counting unit 135_2 of the time delay counting circuit adjusts the second count value to 0.

The multi-level over-current protection circuit 130 further includes a first current divider 120_1 and a second current divider 120_2. The first end of the first current divider 120_1 is coupled to the first end of the second current divider 120_2, the power supplier 110 and the signal amplification circuit 131. The second end of the first current divider 120_1 and the second end of the second current divider 120_2 are coupled to the signal amplification circuit 131.

The power supplier 110 provides a first detection signal +12VIS to the first end of the first current divider 120_1, the first end of the second current divider 120_2 and the signal amplification circuit 131. The second end of the first current divider 120_1 outputs a second detection signal +12VA to the signal amplification circuit 131. The second end of the second current divider 120_2 outputs a third detection signal +12VB to the signal amplification circuit 131.

The first detection signal +12VIS, the second detection signal +12VA and the third detection signal +12VB form a set of detection signals inputted to the signal amplification circuit 131.

Referring to FIG. 2, a relation diagram of reference signals OC1 to OCn and protection time delays $\Delta T1$ to $\Delta Tn$ according to an embodiment of the present invention is shown. As indicated in FIG. 2, as for the reference signals OC1 to OCn, OC1<OC2< . . . <OCn; and as for the protection time delays $\Delta T1$ to $\Delta Tn$, $\Delta T1 > \Delta T2 > . . . > \Delta Tn$. That is, the reference signals progressively increase, but the protection time delays progressively decrease.

Figure 3:
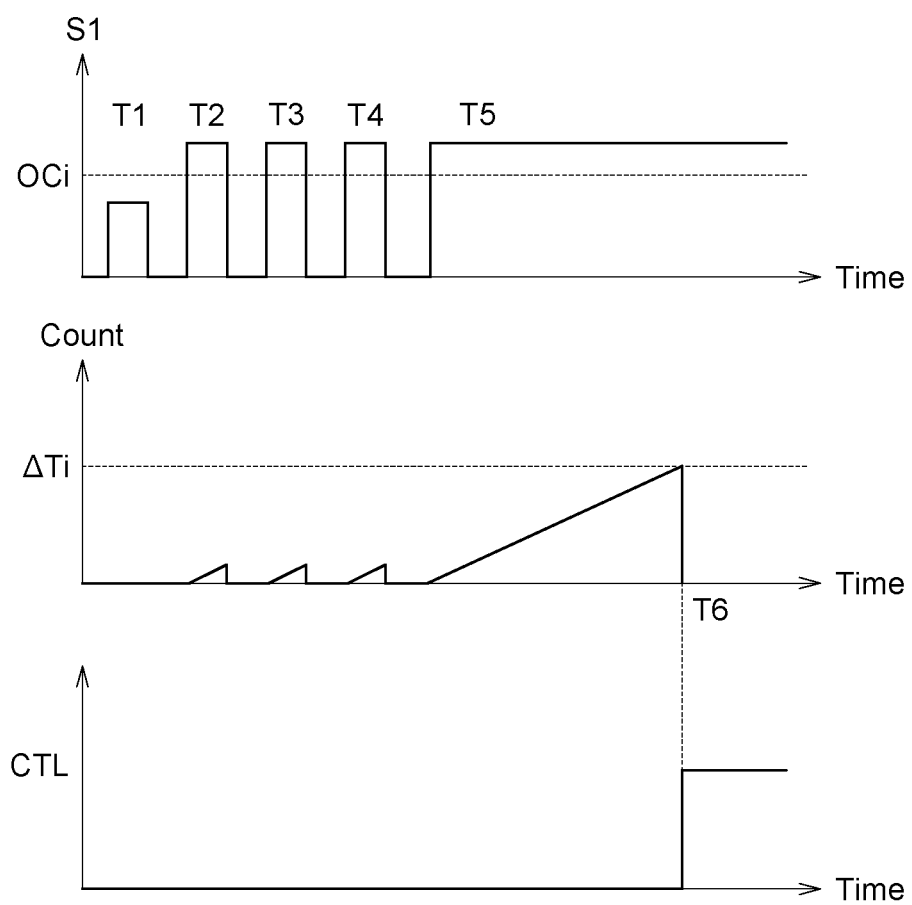
FIG. 3 is a signal timing diagram according to an embodiment of the present invention.

FIG. 3 is a signal timing diagram according to an embodiment of the present invention. At time point T1, the first signal S1 is less than the reference signal OCi, so the time delay counting circuit 135_i does not trigger counting.

At time points T2 and T3 and T4, the first signal S1 is greater than reference signal OCi, and the time delay counting circuit 135_i triggers counting but does not activate the protection mode because the count value is not greater than the protection time delay $\Delta Ti$. That is, if the duration at which the first signal S1 is greater than the reference signal OCi is not greater than the protection time delay $\Delta Ti$, there is no need to activate the protection mode.

At time point T5, the first signal S1 is greater than the reference signal OCi, and the time delay counting circuit 135_i triggers counting; and when count value is greater than the protection time delay $\Delta Ti$ (such as T6), the time delay counting circuit 135_i activates the protection mode. That is, if the duration at which the first signal S1 is greater than the reference signal OCi is greater than protection time delay $\Delta Ti$, the protection mode needs to be activated to protect the power supplier 110.

Figure 4:
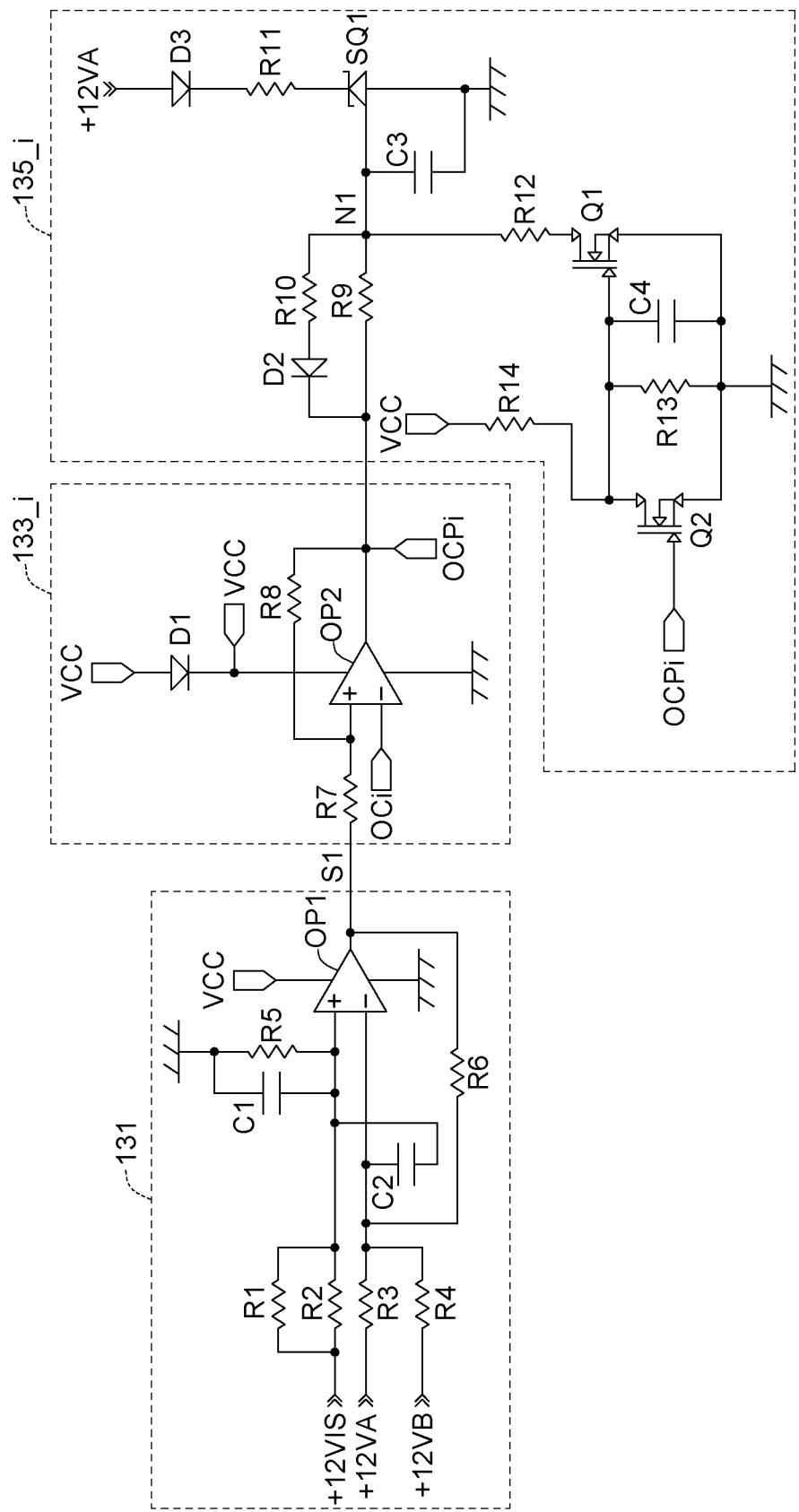
FIG. 4 is an architecture diagram of a signal amplification circuit, a comparison circuit and a time delay counting circuit according to an embodiment of the present invention.

FIG. 4 is an architecture diagram of a signal amplification circuit 131, a comparison circuit 133 and a time delay counting circuit 135 according to an embodiment of the present invention. For the diagram to be better understood, FIG. 4 only illustrates a comparison unit 133_i of the comparison circuit 133 and a time delay counting unit 135_i of the time delay counting circuit 135. As indicated in FIG. 4, the signal amplification circuit 131 includes: an operation amplifier OP1, resistors R1 to R6 and capacitors C1 to C2. The comparison unit 133_i includes: an operation amplifier OP2, resistors R7 to R8 and a diode D1. The time delay counting unit 135_i includes: resistors R9 to R14, capacitors C3 to C4, diodes D2 to D3, a Schottky diode S1 and transistors Q1 to Q2. The circuit architecture of FIG. 4 is merely a possible embodiment for explaining not for limiting the present invention. Other possible embodiments of the circuit architecture of the signal amplification circuit, the comparison circuit and the time delay counting circuit are still within the spirit of the present invention.

In the signal amplification circuit 131, the resistors R1 and R2 are connected in parallel between the first detection signal +12VIS and the first input end of the operation amplifier OP1. The resistor R3 is coupled between the second detection signal +12VA and the second input end of the operation amplifier OP1. The resistor R4 is coupled between the third detection signal +12VB and the second input end of the operation amplifier OP1. The resistor R5 is coupled between the first input end of the ground end and the operation amplifier OP1. The resistor R6 is coupled between the second input end and the output end of the operation amplifier OP1. The capacitor C1 is coupled between the ground end and the first input end of the operation amplifier OP1. The capacitor C2 is coupled between the first input end and the second input end of the operation amplifier OP1. The operation amplifier OP1 includes: a first input end configured to receive a first detection signal +12VIS; a second input end configured to receive a second detection signal +12VA and a third detection signal +12VB; and an output end configured to output the first signal S1 to the first input end of the operation amplifier OP2 of the comparison unit 133_i via the resistor R7.

The first comparison unit (such as 133_1) of the comparison circuit 133 has a first input end, a second input end and a first output end, wherein the first input end receives the first signal S1, the second input end receives the first reference signal OC1, the first comparison unit 1331 outputs the first the first operation signal OCP1 to the time delay counting unit 135_1 of the time delay counting circuit 135 via the first output end according to the first signal S1 and the first reference signal OC1, and the time delay counting unit 135_1 of the time delay counting circuit 135 adjusts the first count value according to the first the operation signal OCP1.

The second comparison unit (such as 133_2) of the comparison circuit 133 has a third input end, a fourth input end and a second output end, wherein the third input end receives the first signal S1, the fourth input end receives the second reference signal OC2, the second comparison units 133_2 outputs the second the operation signal (OCP2) to the time delay counting unit 135_2 of the time delay counting circuit via the second output end according to the first signal S1 and the second reference signal, and the time delay counting unit 135_2 of the time delay counting circuit adjusts the second count value according to the second the operation signal (OCP2).

To put it in greater, in the comparison unit 133_i, the operation amplifier OP2 includes: a first input end configured to receive the first signal S1 of the operation amplifier OP1 via the resistor R7; a second input end configured to receive a reference signal OCi; and an output end configured to output the operation signal OCPi to the time delay counting unit 135_i. The resistor R7 is coupled between the output end of the operation amplifier OP1 and the first input end of the operation amplifier OP2. The resistor R8 is coupled between the first input end and the output end of the operation amplifier OP2. The diode D1 is configured to provide an operating voltage VCC to the operation amplifier OP2.

In the time delay counting unit 135_i, the resistor R9 is coupled between the output end of the operation amplifier OP2 and a node N1. The resistor R10 and the diode D2 are connected in series between the node N1 and the output end of the operation amplifier OP2. The resistor R11 and the diode D3 are connected in series between the cathode of the Schottky diode S1 and the second detection signal +12VA. The resistor R12 is coupled between the drain of the transistor Q1 and the node N1. The resistor R13 and the capacitor C4 are connected in parallel between the source and the gate of the transistor Q1. The resistor R14 is coupled between the drain of the transistor Q2 and the operating voltage VCC. The capacitor C3 is coupled between the node N1 and the ground end. The Schottky diode S1 includes: an anode coupled to the ground end; and a cathode coupled to the resistor R11. The transistor Q1 includes: a source coupled to the ground end; a drain coupled to the resistor R12; and a gate coupled to the drain of the transistor Q2. The transistor Q2 includes: a source coupled to the ground end; a drain coupled to the gate of the transistor Q1; and the gate configured to receive the operation signal OCPi.

The operation signal OCPi of the comparison unit 133_i is coupled to the gate of the transistor Q2 of the time delay counting unit 135_i. The operation signal OCPi of the comparison unit 133_i can turn on or turn off the transistor Q2 of the time delay counting unit 135_i.

In an embodiment of the present invention, when the Schottky diode S1 of the time delay counting unit 135_i is turned on, the first detection signal +12VIS will drop to a low level and will activate the protection mode, such that the first current divider 120_1 outputs a low-level second detection signal +12VA to the signal amplification circuit 131, and the second current divider 120_2 outputs a low-level third detection signal +12VB to the signal amplification circuit 131.

In above embodiments of the present invention, the over-current protection levels (the reference signals OC1, OC2, OC3, . . . OCn) and the protection time delays ΔT1, ΔT2, ΔT3, . . . ΔTn are defined. Depending on actual situations, the number of protection levels (that is, the value of n) as well as the values of the reference signals OC1, OC2, OC3, . . . OCn and/or the values of the protection time delays ΔT1, ΔT2, ΔT3, . . . ΔTn can be adjusted, and are still within the spirit of the present invention.

As the dynamic load conditions change, the protection time delay required for each load condition will be different because single protection level can no longer satisfy the needs of the current trend. In an embodiment of the present invention, a control unit (not illustrated) can be used to adjust the over-current protection point (that is, the reference signals OC1, OC2, OC3, . . . OCn) and the protection time delays (ΔT1, ΔT2, ΔT3, . . . ΔTn). Additionally, to achieve optimum design, the control unit can further include multi-level protection points according to the dynamic load conditions.

The multi-level over-current protection circuit disclosed in an embodiment of the present invention can adjust triggering delay by changing the values of ΔT1, ΔT2, ΔT3, . . . ΔTn.

The multi-level over-current protection technique disclosed in an embodiment of the present invention is used in the over-current protection and the delay protection. When the first signal is greater than a reference signal, time counting is activated. When the set condition is met (that is, when the count reaches the protection time delay), the multi-level over-current protection circuit activates the protection mode. The multi-level over-current protection technique disclosed in an embodiment of the present invention adjusts the over-current protection point according to the instant dynamic load.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multi-level over-current protection circuit coupled to a power supplier, the multi-level over-current protection circuit comprising:
a signal amplification circuit configured to receive a set of detection signals and output a first signal;
a comparison circuit coupled to the signal amplification circuit to compare the first signal with a first reference signal and a second reference signal respectively, wherein a value of the first reference signal is less than a value of the second reference signal;
a time delay counting circuit coupled to the comparison circuit, and
a first current divider and a second current divider, wherein a first end of the first current divider is coupled to a first end of the second current divider, the power supplier and the signal amplification circuit, and a second end of the first current divider and a second end of the second current divider are coupled to the signal amplification circuit,
wherein, when a value of the first signal is greater than or equal to the value of the first reference signal and is less than the value of the second reference signal, the time delay counting circuit adjusts a first count value; when the first count value reaches a first protection time delay, the time delay counting circuit activates a protection mode,
when the value of the first signal is greater than or equal to the value of the second reference signal, the time delay counting circuit adjusts a second count value; when the second count value reaches a second protection time delay, the time delay counting circuit activates the protection mode, wherein, the first protection time delay is greater than the second protection time delay.

2. The multi-level over-current protection circuit according to claim 1, wherein, the comparison circuit further compares the first signal with a third reference signal, when the value of the first signal is greater than or equal to a value of the third reference signal, the time delay counting circuit adjusts a third count value; when the third count value reaches a third protection time delay, the time delay counting circuit activates the protection mode, the value of the second reference signal is less than the value of the third reference signal, and the second protection time delay is greater than the third protection time delay.

3. The multi-level over-current protection circuit according to claim 1, wherein, when the value of the first signal is less than the value of the first reference signal, the time delay counting circuit adjusts the first count value to 0.

4. The multi-level over-current protection circuit according to claim 1, wherein, when the value of the first signal is less than the value of the second reference signal, the time delay counting circuit adjusts the second count value to 0.

5. The multi-level over-current protection circuit according to claim 1, wherein the power supplier provides a first detection signal to the first end of the first current divider, the first end of the second current divider and the signal amplification circuit, the second end of the first current divider outputs a second detection signal to the signal amplification circuit, and the second end of the second current divider outputs a third detection signal to the signal amplification circuit.

6. The multi-level over-current protection circuit according to claim 5, wherein the first detection signal, the second detection signal and the third detection signal form the set of detection signals.

7. The multi-level over-current protection circuit according to claim 1, wherein, the comparison circuit comprises:
- a first comparison unit having a first input end, a second input end and a first output end, wherein the first input end receives the first signal, the second input end receives the first reference signal, the first comparison unit outputs a first operation signal to the time delay counting circuit via the first output end according to the first signal and the first reference signal, and the time delay counting circuit adjusts the first count value according to the first the operation signal; and
- a second comparison unit having a third input end, a fourth input end and a second output end, wherein the third input end receives the first signal, the fourth input end receives the second reference signal, the second comparison unit outputs a second operation signal to the time delay counting circuit via the second output end according to the first signal and the second reference signal, and the time delay counting circuit adjusts the second count value according to the second the operation signal.

\* \* \* \* \*